Figure 1:
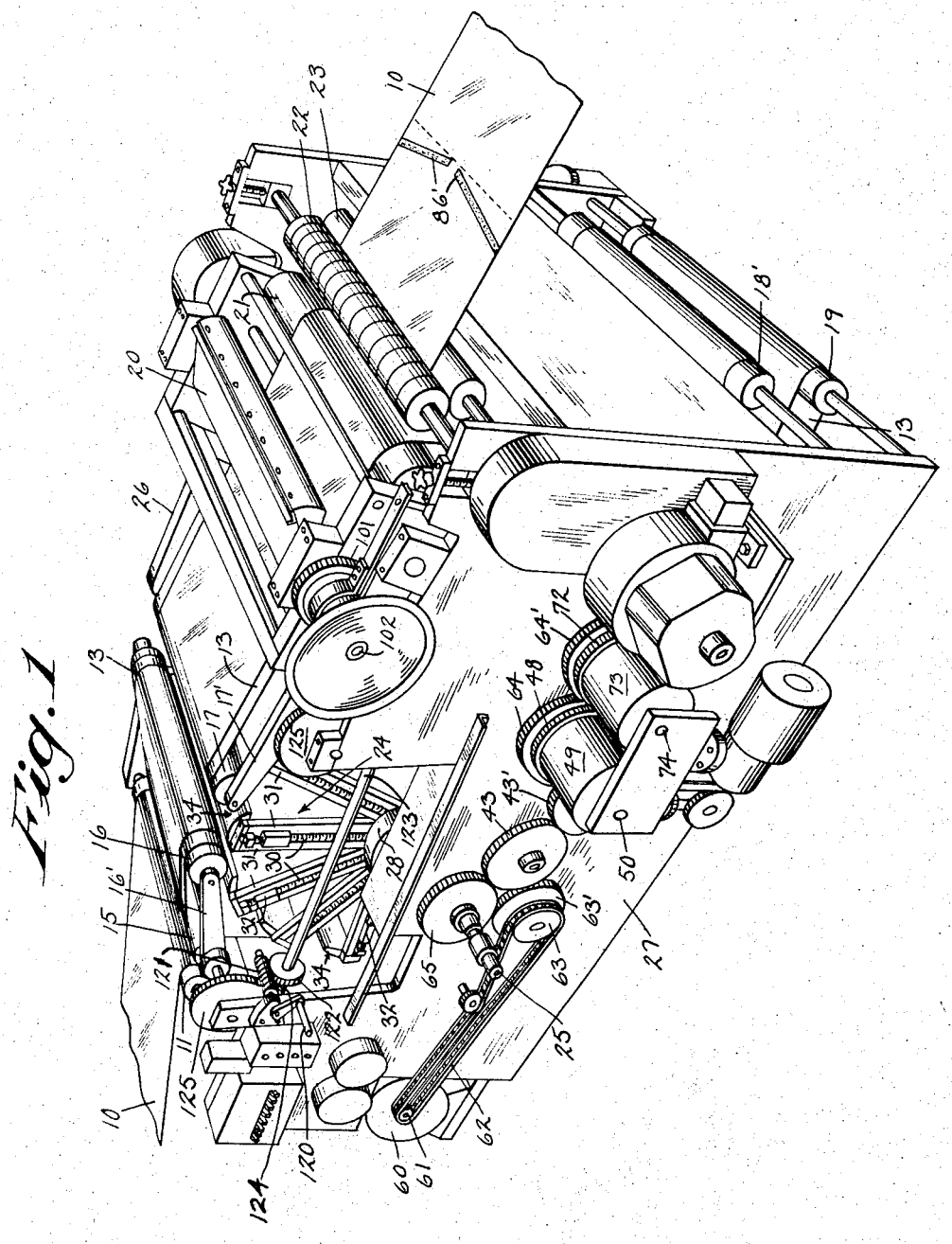

Dec. 26, 1967     R. H. COCHRANE     3,360,416
ROTARY SEALING DEVICES FOR EFFECTING TRANSVERSE SEALS
Filed July 8, 1964     5 Sheets-Sheet 1

INVENTOR
RICHARD H. COCHRANE

BY

Morrell & Morrell

ATTORNEYS

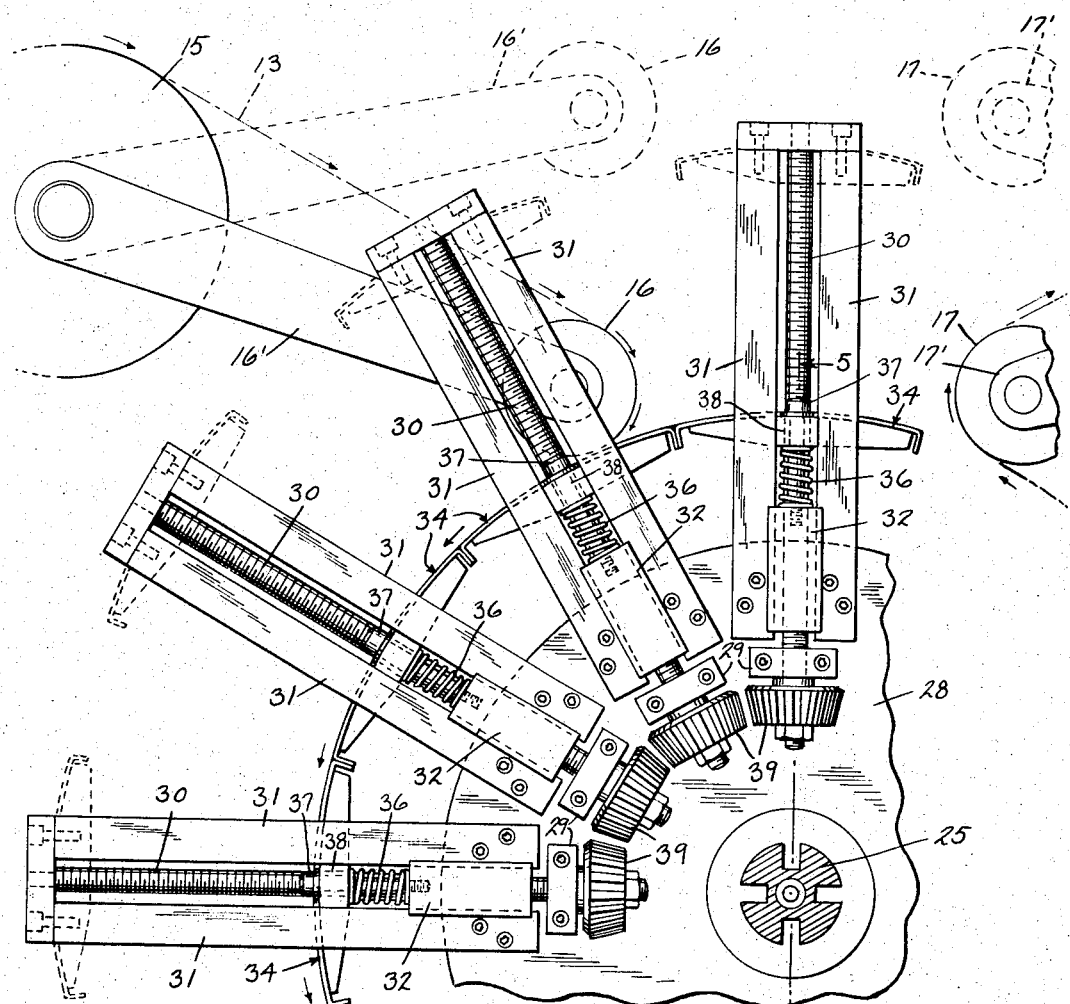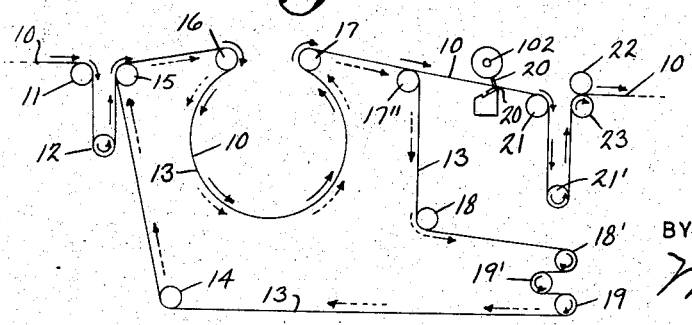
Dec. 26, 1967  R. H. COCHRANE  3,360,416
ROTARY SEALING DEVICES FOR EFFECTING TRANSVERSE SEALS
Filed July 8, 1964  5 Sheets-Sheet 2
Fig.2
Fig.8
INVENTOR
RICHARD H. COCHRANE
BY
Morsell & Morsell
ATTORNEYS

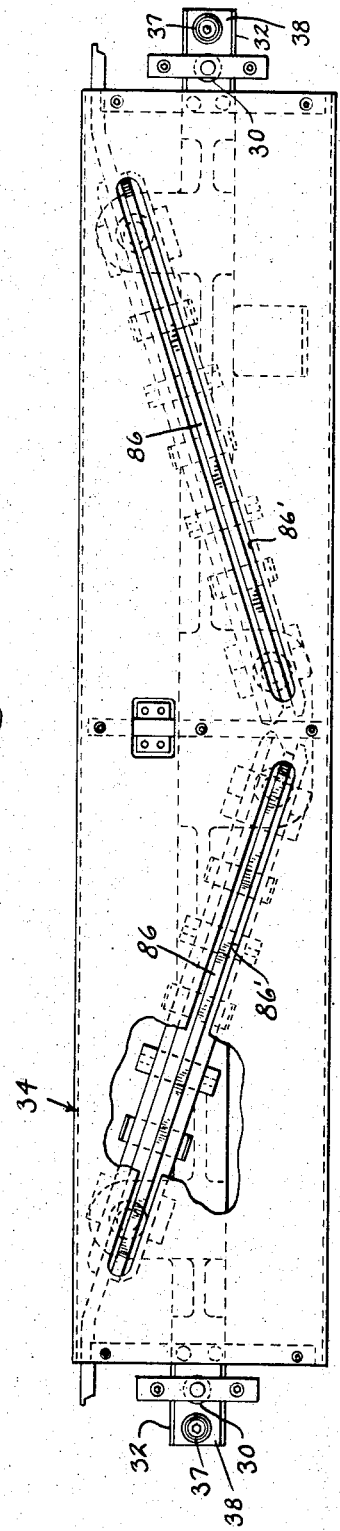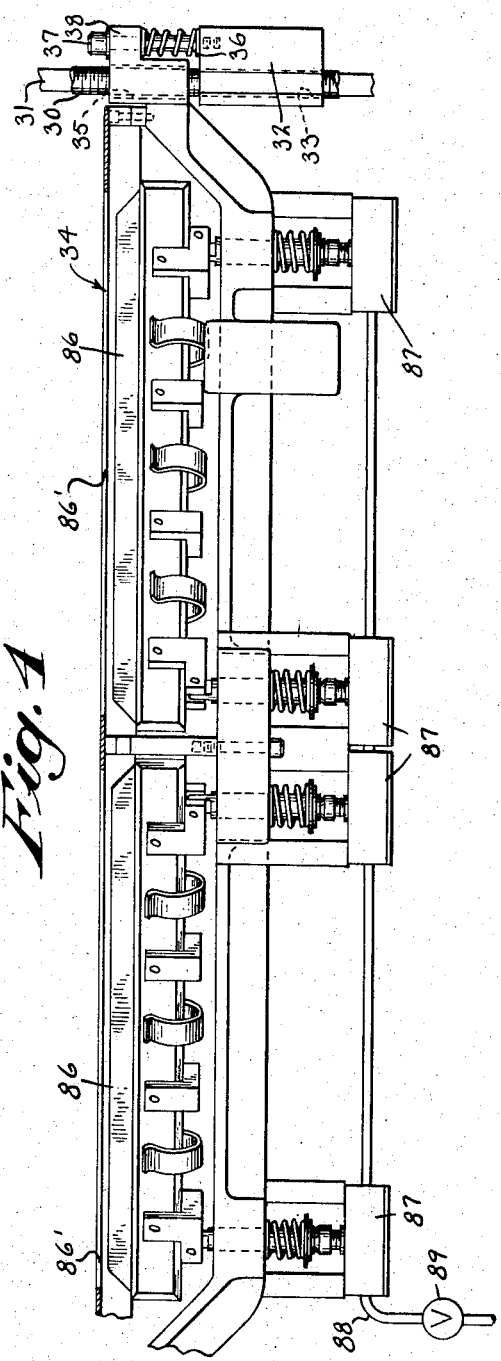

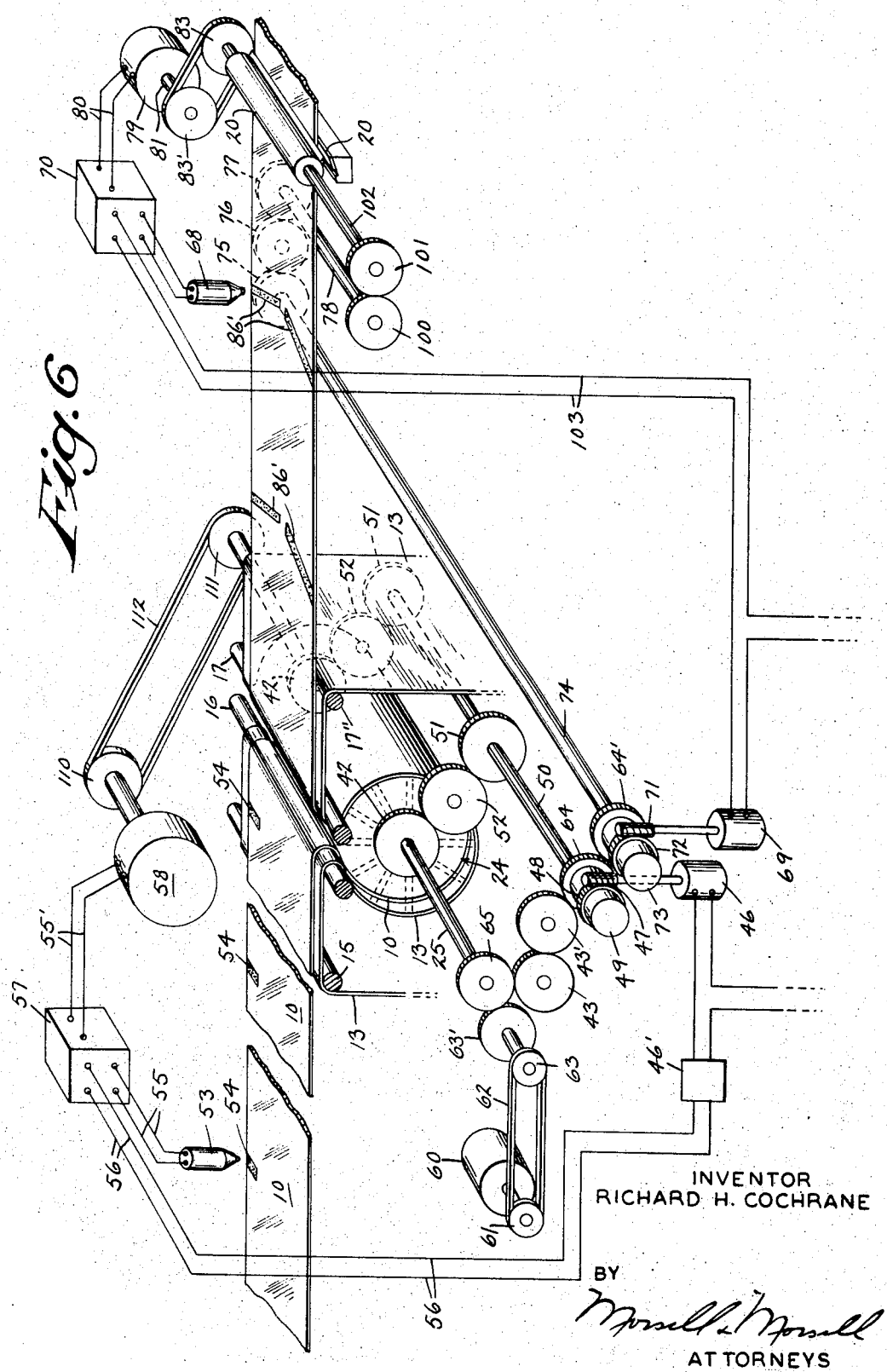

ately on
United States Patent Office 3,360,416
Patented Dec. 26, 1967

3,360,416
ROTARY SEALING DEVICES FOR EFFECTING
TRANSVERSE SEALS
Richard H. Cochrane, Milwaukee, Wis., assignor to Pratt
Manufacturing Corporation, Milwaukee, Wis., a corporation of Wisconsin
Filed July 8, 1964, Ser. No. 381,142
8 Claims. (Cl. 156—359)

This invention relates to improvements in rotary sealing devices for effecting transverse seals.

In Mercer Patent No. 2,680,471, dated June 8, 1954, there is disclosed a heat and pressure sealing device which provides means for effecting transverse seals in thermoplastic sheet stock wherein there is a relatively lengthy application of heat while the stock is advancing around a rotatable cylindrical drum. In this prior device the stock, pre-cut in desired lengths, is fed successively to the sealing apparatus. Where stock is pre-cut there are relatively few mechanical problems connected with feeding each piece in such a manner that it is sealed at the proper location.

It is a general object of the present invention to provide a rotary sealing device capable of receiving a continuous web of heat sealable material, either in the form of continuous tubes or in the form of continuous multi-ply material. Where the material is in the form of a continuous web which is fed continuously to the rotary sealer, it is necessary that it be engaged by the sealing stations along properly spaced transverse lines, depending upon the product being produced, and it is desirable that the apparatus be variable so that it can be quickly changed to produce bags of different length as may be required in use. There is also the problem of creeping, when feeding a continuous web, which creeping may throw the material off in one direction or the other, longitudinally of the web, and cause the transverse seals to be slightly off location. With the invention of the Mercer patent, where single lengths of material were fed in successively, these problems were not present.

It is a general object of the present invention to provide a circular rotary sealing device having spaced transverse sealing stations wherein there is means for quickly changing the radial distance of the stations from the axis of rotation to thereby change the distance of the stations from one another and hence vary the distance between transverse seals on the continuous web to suit requirements, while maintaining a substantially circular form for the rotary sealing device.

A further object of the invention is to provide a device as above described wherein there is means for automatically varying the radial distance of the stations from the axis of rotation during operation to compensate for creeping of the web to thereby automatically shorten or lengthen the span between transverse seals while the apparatus is operating.

A more specific object of the invention is to provide apparatus as above described wherein the automatic compensation is responsive to the action of a photoelectric cell, the latter being programmed by lines or marks on the web.

A further object of the invention is to provide an improved rotary sealing device wherein a substantially longer sealing time is obtained than in the construction of the before-mentioned Mercer patent.

A further object of the invention is to provide a rotary sealing device having means for producing a variable adjustment in the radial distance of the sealing stations from the axis of rotation while maintaining the distance between sealing stations equal in any range of adjustment.

A further object of the invention is to provide a rotary sealing device having a number of equally spaced, radially adjustable, peripheral segments or stations wherein a predetermined number of said stations are sealing stations which are so arranged that when the total number of stations is divided by two, three, and four the stations of the resulting groups are equally spaced; and wherein the remaining stations of the total number are not sealing stations, and wherein there is means for selectively rendering predetermined sealing stations inoperative so that the groups of sealing stations, in combination with a two to three adjustment ratio for the rotary sealing device (the minimum adjusted diameter being ⅔ of the maximum adjusted diameter) provide ranges of equal circumferential spacing between operable sealing stations in each group. Said ranges provide a wide continuous selection of spacing between transverse seals from the minimum spacing of the smallest range to the maximum spacing of the largest range. For example, it is thus possible, in a rotor with a radial adjustment ratio of two to three to obtain groups of 2, 3, 4, 6, 8, 12 etc. equally spaced sealing stations with combined range of variation in distance between operative sealing stations of at least a four and one half to one ratio, with larger ratios of variation obtained as more groups of sealing stations are provided.

A further object of the invention is to provide an improved rotary sealing device for operating on a continuous web of material wherein there is a perforating or severing knife positioned to operate on the discharging material to perforate or sever the continuous web at predetermined locations which are related to the position of the transverse seals, it being a feature of one form of the invention to control a perforating or cut-off knife by means of electronic mechanism including a photoelectric cell.

With the above and other objects in view, the invention consists of the improved rotary sealing device and all of its parts and combinations, as set forth in the claims and all equivalents thereof.

Figure 5:
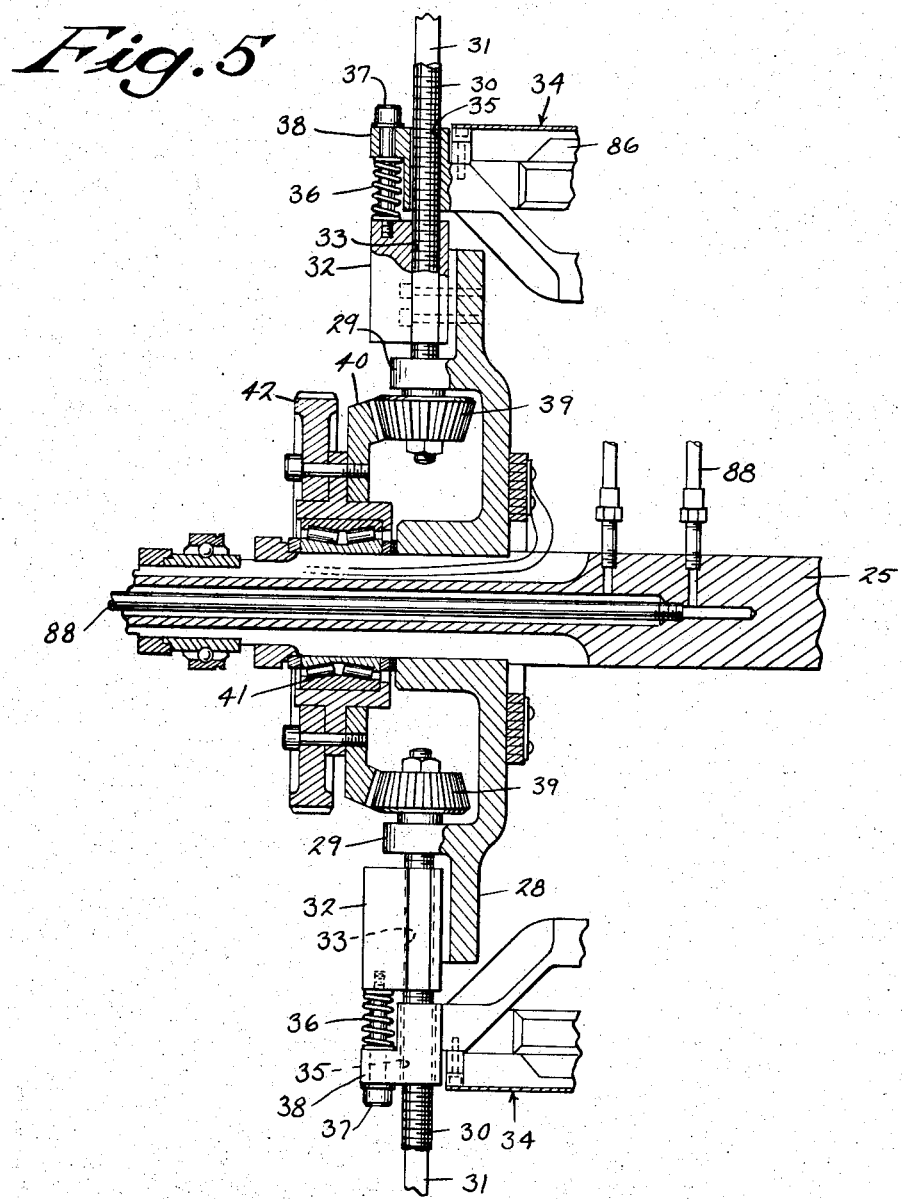
Figure 7:
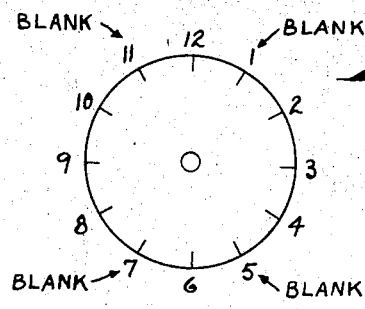

In the accompanying drawings, illustrating one complete embodiment of the invention, in which the same reference numerals designate the same parts in all of the views:

FIG. 1 is a perspective view of the improved rotary sealing apparatus; FIG. 2 is a fragmentary vertical sectional view through the rotor showing several of the adjustable sealing stations, the dot and dash lines indicating alternative positions of adjustment of said stations; FIG. 3 is a plan view of one of the sealing stations; FIG. 4 is a front view of the sealing station of FIG. 3; FIG. 5 is a fragmentary sectional view taken approximately on the line 5—5 of FIG. 2; FIG. 6 is a perspective view showing the apparatus diagrammatically and showing the automatic control hook up; FIG. 7 is a diagrammatic view showing a station arrangement for producing widely variable but equal spacing between transverse seals; and FIG. 8 is a diagrammatic view showing the manner of threading of the web and pressure belt through the machine.

Referring more particularly to the drawings, the stock 10 to be sealed is fed from a suitable supply roll (not shown). This stock is usually flattened, tubular polyethylene or other thermoplastic material adapted to be eventually severed in desired lengths to form bags for various products. The machine illustrated is particularly well adapted for the formation of garment bags having sloping shoulder portions, but, of course, may be used for a wide range of purposes. In lieu of tubular stock, multi-ply stock may be fed in from the supply roll.

Referring to FIG. 1, the entering material passes over a roller 11, downwardly around and beneath a roller 12 (see FIG. 8), and then upwardly with a traveling support and pressure belt 13. The latter is trained around rollers 14, 15 and 16, around the rotary sealing device 24, and up to the top again around rollers 17, 17", 18, 18' and 19, there being a pressure loaded (by pneumatic or other suitable means), belt-tightener roller 19' which is automatically adjustable to accommodate the belt length requirements of the adjusted diameter of the rotor, while maintaining constant belt tensions. The rollers 16 and 17 are swingably supported on arms 16' and 17' respectively, and are adapted to be swung by any suitable means to conform to the effective size of the rotor as indicated by broken lines in FIG. 2. One of such means is illustrated in FIG. 1 and comprises a crank 120 operating a worm 121. The worm in turn coacts with a worm wheel 122 on a shaft 123. Both ends of the shaft 123 carry worms 124 which coact with worm wheels 125. One worm wheel 125 is mounted on the shaft for the swingable arms 16' and the other on the shaft for the swingable arms 17'. Thus, when the crank 120 is turned, the arms 16' and 17' may be swung up or down to raise or lower the rollers 16 and 17 to conform to the effective size of the rotor. The web of material 10 passes between the rotary sealing device and the resilient supporting and pressure belt 13 while the transverse seals are being effected, as will be hereinafter described. After emerging from the discharge side of the rotary sealer, the web of material 10 passes between the cooperating transverse cutting or perforating devices 20, around rollers 21 and 21', and up again between delivery rollers 22 and 23. Where the web is only perforated it is rewound in continuous form on a roll in condition for subsequent use. If the apparatus 20 makes a complete severence, which is not the illustrated embodiment shown in FIG. 1, the severed bags can be immediately delivered to discharge and piled in stacks, or controlled by other means.

The rotary sealer proper, designated generally by the numeral 24, consists of a center shaft 25 suitably journaled for rotation between the side members 26 of the frame 27. Rigidly mounted in axially spaced relationship on the shaft 25 are hubs 28 (see FIGS. 2 and 5). Suitably supported for rotation in positions radially of the hubs, by means of bearing projections 29 on the hubs, are adjustment screws 30. Each adjustment screw is located between a pair of guiding bars 31 (see FIG. 2). Slidable between each pair of guiding bars is a traveling block 32 having a threaded bore 33 through which the screw 30 is threaded. Thus, upon rotation of each screw 30 the traveling block 32 is made to move between the guides 31 in one direction or the other, depending upon the direction of rotation of the screw. Sealing stations 34, each having a non-threaded clearance bore 35 for the screw at each end are resiliently supported on the traveling blocks 32 through the medium of springs 36 surrounding pins 37, each pin passing through an ear 38 at the end of a sealing station, and the free end of the pin being threaded into the adjacent traveling block 32. Thus, as the screws are rotated, the traveling blocks are caused to move radially in and out to produce corresponding movement of the sealing stations 34. This movement is simultaneous in an inward direction, but in an outward direction it is successive as each station leaves the restraint of belt 13 at roller 17. During this action the belt 13 adjusts itself to the new diameter of the rotor through the action of the pressure loaded roller 19' (see FIG. 8).

While any suitable means may be provided for adjusting the radial distance of the stations from the shaft 25, nevertheless it is proposed to use screws as above described and to provide means for causing simultaneous adjustment of all of the screws and blocks 32.

In the preferred embodiment, the inner end of each screw 30 has a rigidly mounted bevel gear 39 (see FIG. 5) which meshes with a ring gear 40. The latter is suitably mounted around the shaft 25, as shown in FIG. 5, for coaxial rotation on a roller bearing set 41. Bolted to the outer face of the ring gear 40 is a gear 42. The drive for the rotary sealer is through a motor 60 having a driven sproket 61 which is connected by an endless chain 62 with a sprocket wheel 63. The latter imparts rotation to a suitably journaled gear 63' which drives a gear 65 on the shaft 25 of the rotary sealer to drive the latter. Through intermediate gears 43 and 43' the ring gears 64 and 64' of the differential drums 49 and 73 are driven for purposes to be hereinafter described. In the embodiment of the invention shown diagrammatically in FIG. 6, a reversible electric motor 46 having a worm 47 on its drive shaft engages a worm wheel 48 on the differential drum 49, the latter being arranged to drive a shaft 50 which is journaled transversely through the frame. The shaft 50 has rigid gears 51 thereon which coact through change gears 52 with the gears 42 on opposite ends of the device, it being understood that the drum-adjusting mechanism shown in FIG. 1 is duplicated on the opposite side of the machine.

A photoelectric cell 53, which is suitably supported over the traveling web, is adapted to be influenced by printed marks 54 on the web. When the beam is interrupted by a mark, there is a corresponding impulse in the circuit lines 55 and 56 leading to the electric motor 46 through a registration control box 57, the said box also being electrically connected with a selector switch 58. Such impulse is, therefore, capable of causing brief rotation of the electric motor 46 in one direction or the other to cause corresponding radial adjustment of the sealing stations 34, through the action of the differential 49, shaft 50, gears 51, 52 and 42, ring gear 40, bevel gears 39 and screws 30. This results in a slight change in the distance between stations. The timer or selector switch 58, which is a well known device, is suitably driven from the rotor shaft 25 in any desired manner through the sprockets 110 and 111 and chain 112 as illustrated in FIG. 6. Thus the selector switch or timer 58 is normally turning with the drum. When a spot such as one of the spots 54 is coming through in proper location with respect to the position of sealing the selector switch 58 automatically maintains the circuit 56 to the reversible motor 46 open as is well known in the art. Whenever, because of creeping or other error, a spot 54 is out of proper position so that the position of sealing would be out of proper relationship with printed matter on the packaging, then the selector switch 58, as dictated to by the photoelectric cell 54, automatically closes the circuit 56 to the motor 46 to prepare the circuit for a correcting action. Such correcting action is then accomplished by one of the marks 54 interrupting the beam to the photoelectric cell 53 either ahead or behind proper position. This then energizes the reversible motor 46 in a desired direction, acts through the worm 47 and worm wheel 48 on the differential 49 to advance or retard the shaft 50. Shaft 50, in turn, acts through the gears 51, 52, 42, 40 and 39 to adjust the radial positions of the sealing stations 34 in one direction or another to accomplish the correction. This provides a suitable correction so that the sealing will properly coincide with the printing on the web 10. Thus any accidental creeping of the web can be automatically compensated for.

If it is desired to adjust the radial distance of the sealing stations from the axis 25 independently of the action of the electric eye 53 this may be readily accomplished. For example, such adjustment may be needed at the time of setup of the machine for different spacings between seals to suit requirements. Such adjustment is accomplished by operating a suitable reversing switch 46' in the circuit to the motor 46 to start the motor in a desired direction. This will then act through the worm 47, worm gear 48, differential 49, shaft 50, gears 51, 52, 42, 40 and 39 and screws 30 to adjust the radial distance of the stations from the axis 25 in one direction or the other, as required for the particular piece of work.

When no correction is being made the gears 42 rotate with a one-to-one ratio with respect to the sealing rotor.

When it is desired to also correlate the printed matter on a web with the perforating or cut-off mechanism 20 there may be another photoelectric cell 68 which is electrically connected with a correction motor 69 through a registration control box 70 (see FIG. 6). The correction motor carries a worm 71 on its drive shaft which acts on a worm wheel 72 on a differential drum 73 to cause correction rotation of a suitably journaled shaft 74. The differential is normally driven by engagement of its gear 64' with the gear 64 on the differential 49, and the latter is normally driven by engagement with the gear 43' which is in the train 63', 65 and 43. The shaft 74 carries a change gear 75 from which rotation is transmitted through a swing gear 76 to a gear 77 on the shaft 78. Through gears 100 and 101 the perforator shaft 102 for the upper perforator 20 may be retarded or advanced somewhat in order to effect a correction in the position of the line of perforation or cut-off with respect to printed matter on the web.

A selector switch 79 is wired, as at 80, to the registration control box, and a shaft 81 from the switch may be connected by an endless chain 82 with a sprocket wheel 83 on the perforator shaft 102.

Selector switches are well known, and the selector switch 79 is normally turning with the perforator shaft 102. When a spot such as one of the spots 54, or other printed material, is coming through in proper position with respect to the proper line of severance, perforation or cut-off, then the selector switch 79 automatically maintains the circuit 103 to the electric motor 69 in open condition. Whenever, however, because of creeping or other error, the printed material is out of proper registration, so that the line of perforation or cut-off would be out of position with respect to the printed matter, when the selector switch 79 will automatically close the circuit in the wires 103 to the motor 69 to prepare the circuit for correcting action. Such correcting action is then accomplished by one of the marks 54 interrupting the beam to the photoelectric cell 68 either ahead or behind proper position, as is well known in the art. This then energizes the reversible electric motor 69 in a required direction, acts through the worm 71, worm wheel 72, differential 73, shaft 74, gears 75, 76, 77, 100 and 101 to advance or retard the shaft 102 a small amount to accomplish the desired correction.

The sealing stations 34 have movably mounted thereon suitable electric heating elements 86 which are adapted to cooperate with successive portions in the length of the advancing web for subjecting said portions to heat transversely thereacross during the travel of the web around the sealing rotor 24. During such travel the flexible belt 13 is engaging the opposite side of the web to apply resilient pressure thereto as sealing is taking place. The sealing mechanism is a well known type and will not be described in detail. There are, however, pneumatic cylinders 87 (FIG. 4) in the circuit of a pneumatic line 88 leading from a suitable source of compressed air. Normally the air valve 89 is open, causing the sealing members 86 to be maintained in a position where they are projected outwardly through the slots 86' to accomplish the sealing purpose. By closing the air valve 89 leading to the air cylinders 87 of any one or more of the sealing stations, it is possible to keep the sealing members 81 retracted to render selected sealing stations inoperative for a purpose to be hereinafter described.

With the arrangement illustrated in FIGS. 1 and 6, the sealing action takes place through in excess of 280° of rotation. Thus, the heat sealing is operable for a prolonged period of time.

When utilizing the machine illustrated to manufacture transparent garment bags from flat tubular stock, the heating elements 86 are arranged in V-shape, as shown in FIG. 3, to seal along sloping lines 86' (FIG. 6) to match the shoulder lines of a garment. In other articles the seal may be along straight transverse lines.

Referring now to FIG. 7, this illustrates diagrammatically a sealing rotor having twelve stations as consecutively numbered, including four permanently blank stations 1, 5, 7 and 11 (devoid of heating elements) as indicated. If it is desired to have only two stations operative, the air valves 89 may be shut off for all of the other stations except the stations numbered 12 and 6. If it is desired to have four stations operative, the air valves 89 are turned off for all of the stations except the stations numbered 12, 3, 6 and 9. If it is desired to have three stations operative, the air valves are turned off for all of the stations except the stations numbered 12, 4 and 8. If it is desired to have six operative stations, the air valves 89 are turned off for all of the stations except the stations numbered 12, 2, 4, 6, 8 and 10.

With the above arrangement, assuming that a rotor is employed with an adjustment ratio of two-to-three, having stations which are adjustable to provide an effective diameter of between 30 and 45 inches, and to provide an effective circumference of between 94.248 and 141.372 inches, the chart below illustrates the myriad of size ranges possible in the one rotor, with all of the combinations providing equally spaced stations around the periphery:

| Number of active sealing stations: | Range of product sizes (distance between transverse seals), inches |
| --- | --- |
| 2 | 47.125–70.686 |
| 3 | 31.416–47.124 |
| 4 | 23.562–35.343 |
| 6 | 15.708–23.562 |

It is thus apparent from FIG. 7 and from the above description that a predetermined number of the stations, such as stations 12, 2, 3, 4, 6, 8, 9 and 10, are operative sealing stations which are so arranged that when the total number of stations (12) is divided by 2, 3, and 4, the stations of the resulting groups are equally spaced circumferentially. It is also clear from FIG. 7 that "blank" stations 1, 5, 7 and 11 are not sealing stations, but are radially adjustable. By selectively rendering predetermined ones of the sealing stations 12, 2, 3, 4, 6, 8, 9 and 10 inoperative, any of the resulting groups of sealing stations comprises equally spaced stations when the adjustment ratio of the rotor is two-to-three, that is, the minimum adjusted diameter being ⅔ of the maximum adjusted diameter. The ranges listed in the table above provide a wide continuous selection of spacing between transverse seals from the minimum spacing in the smallest range to the maximum spacing in the largest range. It is thus possible in a rotor with a radial adjustment ratio of two-to-three to obtain groups of 2, 3, 4, 6, 8, 12, etc. equally spaced sealing stations with a combined range of variation in distance between sealing stations of at least a four and one-half to one ratio, with larger ratios of variation obtainable as more groups of sealing stations are provided.

In the illustrated form of the invention, the device 20 is a perforator to merely weaken the material along transverse lines which are related to the lines of sealing. Thereafter the web is wound in rolls for marketing and the individual bags are torn off on the perforated lines at the time of use. The member 20, however, may be a cut-off knife, if desired, in which case the individual garment bags are discharged into stacks.

From the above it is apparent that as the polyethylene film enters the machine it is thereafter caused to travel with the endless belt 13, and is passed around the rotary sealer between said belt 13 and the sealing stations. As before explained, each sealing station will be in contact with the material for in excess of 280°.

Due to the novel sealing station adjustment, the stations may be readily adjusted in and out, simultaneously, to thereby vary the distance between successive stations in accordance with the particular bag to be manufactured.

This adjustment may be made during set up of the machine for a new job, or the adjustment may be accomplished during operation where necessary. In addition, the improved device provides novel means for automatically compensating for creeping of the web to ensure, in the case of a printed web, that the transverse lines of sealing, as well as the lines of perforation or cut-off, correspond properly with the printed matter. The arms 16' and 17' are swingable to automatically conform the position of the delivery roller 16 and take-off roller 17 to any effective adjusted size of the rotor 24.

It is apparent that in any position of radial adjustment of the sealing stations the circumferential spacing between stations is equal. It is also apparent from FIG. 7 and the descriptive matter pertaining thereto that a multitude of variations in product lengths is possible with the same rotor, this being due to the novel radial adjustment of the sealing stations in combination with the arrangement for rendering certain sealing stations inoperative as heretofore explained.

Features of the invention are applicable regardless of whether a continuous web is fed into the machine and it is to be understood that the word "web" in the claims contemplates either a continuous web or a succession of individual lengths of material being fed. Various other changes and modifications may be made without departing from the spirit of the invention, and all of such changes are contemplated as many come within the scope of the claims.

What I claim is:

1. In apparatus for effecting tranverse seals at predetermined longitudinally spaced locations on a continuous multi-ply web of material wherein there is a sealing rotor having spaced sealing stations forming its periphery; means supporting said stations for movement radially of said rotor; means for effecting said radial movement to vary the peripheral distance between sealing stations and the effective diameter of the rotor; flexible belt means cooperable with the outside of the web as it passes around the rotor for applying sealing pressure thereto throughout the sealing operation; and means for supporting and guiding said flexible belt means, said supporting and guiding means including a delivery roller positioned for coaction with the rotor, a take off roller positioned for coaction with the rotor, and swingable arms supporting said delivery and take off rollers, and a common means for swinging said arms simultaneously to control the position of the rollers in accordance with the adjusted diameter of the sealing rotor.

2. In apparatus for effecting transverse seals at predetermined locations on a strip of thermoplastic material wherein there is a sealing rotor having peripherally spaced heat sealing stations having supporting surfaces and wherein there is means for longitudinally feeding the strip to said rotor for subjecting it to heat transversely thereacross, said heat sealing stations having openings in their supporting surfaces sealing elements mounted for movement in said openings to and from retracted position therein, means supporting said stations for movement radially of said rotor, means for effecting said radial movement to vary the peripheral distance between stations, and selective means for causing said retraction of the heating elements of selected stations to render said stations inoperative to thereby increase the range of distances between transverse seals which may be obtained with the same rotor while maintaining uniform spacing between stations around the circumference of the rotor.

3. In apparatus for effecting transverse seals at predetermined locations on a multi-ply web of packaging material wherein there is a driven sealing rotor having spaced sealing stations forming its periphery to effect transverse seals across the web, with the spacing between sealing stations determining the distance between transverse seals on the web, and wherein there is means for supplying said web to said sealing rotor, said web having longitudinally spaced indicia thereon, and wherein there is means supporting said sealing stations for movement radially of the rotor together with adjustment means for effecting said radial movement of all of the stations simultaneously to vary the peripheral distance between stations, the improvement comprising means including a reversible electric motor for operating said adjustment means, an electric eye positioned so that its beam is influenced by said indicia on the web, a rotatable selector switch in the circuit to said motor driven by the sealing rotor and maintaining said circuit open when sealing is being effected in proper locations on the web, and means between said electric eye and motor for causing a correction adjustment of the radial position of the stations operable whenever the selector switch closes said motor circuit whereby a required distance between transverse seals is automatically maintained.

4. In apparatus for effecting transverse seals at predetermined locations on a multi-ply web of packaging material wherein there is a driven sealing rotor having spaced sealing stations forming its periphery to effect transverse seals across the web with the spacing between sealing stations determining the distance between transverse seals on the web, and wherein there is means for supplying said web to said sealing rotor, said web having longitudinally spaced indicia thereon, and wherein there is means supporting said stations for movement radially of the rotor with adjustment means for effecting said radial movement of all of the stations simultaneously to vary the peripheral distance between stations, and wherein there is rotary means positioned to make lines of severance across the web after it leaves the sealing rotor, said means having a drive shaft, the improvement comprising a drive for said drive shaft, a correction drive for said drive shaft including a reversible electric motor, an electric eye positioned so that its beam is influenced by indicia on the web, and means between said eye and electric motor for advancing or retarding said drive shaft to accomplish a desired correction so that the lines of severance are in proper position transversely of the web with respect to the transverse seals.

5. Apparatus for effecting transverse seals as claimed in claim 3 in which there is rotary means positioned to make lines of severance across the web after it leaves the sealing rotor, said means having a drive shaft, a drive for said drive shaft, a correction drive for said drive shaft including a reversible electric motor, an electric eye positioned so that its beam is influenced by indicia on the web, and means between said eye and electric motor for advancing or retarding said drive shaft to accomplish a desired correction so that the lines of severance are in proper position transversely of the web with respect to the transverse seals.

6. Apparatus for effecting transverse seals at predetermined locations on a multi-ply strip of thermoplastic material wherein there is a sealing rotor having peripherally spaced heat sealing stations, and wherein there is means for longitudinally feeding the strip onto said rotor to be supported on said stations for subjecting it to heat transversely thereacross, and wherein there is means for supporting said stations for movement radially of the rotor, and wherein there is means for effecting radial movement of the stations to vary the peripheral distance between stations which includes an adjustment screw for each station having a gear thereon, the improvement comprising a ring gear rotatable independently of and around the rotor shaft in engagement with said gear on the screws to operate the latter simultaneously, and reversible electric motor means independent of the rotor for rotating said ring gear to vary the peripheral distance between stations regardless of whether the rotor is operating, whereby the distance between transverse seals may be varied during operation.

7. In apparatus for effecting transverse seals at predetermined locations on a strip of thermoplastic material wherein there is a sealing rotor having peripherally spaced heat sealing stations with supporting surfaces, and wherein there is means for longitudinally feeding the strip to said rotor for subjecting it to heat transversely thereacross, sealing members carried by said heat sealing stations, means supporting said stations for movement radially of said rotor, means for effecting said radial movement to vary the peripheral distance between stations, and selective means for preventing contact between the sealing members of selected stations and the strip of material while the strip is supported by said supporting surfaces to thereby render said stations inoperative to thereby increase the range of distances between transverse seals which may be obtained with the same rotor while maintaining uniform spacing between stations around the circumference of the rotor.

8. In apparatus for effecting transverse seals at predetermined locations on a strip of thermoplastic material wherein there is a sealing rotor having peripherally spaced heat sealing stations with supporting surfaces and wherein there is means for longitudinally feeding the strip to said rotor for subjecting it to heat transversely thereacross, sealing members mounted for movement to and from a retracted position with respect to said supporting surfaces, means supporting said stations for movement radially of the rotor, means for effecting said radial movement to vary the peripheral distance between stations, and selective means for causing said retraction of the sealing elements of selected stations to render said stations inoperative to thereby increase the range of distances between transverse seals which may be obtained with the same rotor while maintaining uniform spacing between stations around the circumference of the rotor.

References Cited

UNITED STATES PATENTS 2,815,063   12/1957   La Fleur _____ 156—583

DOUGLAS J. DRUMMOND, *Primary Examiner.*